United States Patent [19]

Leiber et al.

[11] 4,291,924
[45] Sep. 29, 1981

[54] ANTI-SKID CONTROL SYSTEM FOR MOTOR VEHICLES

[75] Inventors: Heinz Leiber, Leimen; Jürgen Gerstenmaier, Neckargemünd, both of Fed. Rep. of Germany

[73] Assignee: Robert Bosch GmbH, Stuttgart, Fed. Rep. of Germany

[21] Appl. No.: 21,753

[22] Filed: Mar. 19, 1979

[30] Foreign Application Priority Data

Mar. 18, 1978 [DE] Fed. Rep. of Germany ....... 2811999

[51] Int. Cl.³ ............................................. B60T 8/02
[52] U.S. Cl. ..................... 303/111; 303/96; 303/119
[58] Field of Search ............. 303/111, 103, 20, 95, 303/96, 105, 106, 110, 119; 361/238, 239, 240; 364/426

[56] References Cited

U.S. PATENT DOCUMENTS 3,653,727 4/1972 Kullberg et al. ................ 303/20 X
3,832,009 8/1974 Leiber et al. ...................... 303/111
3,907,377 9/1975 Mayer ................................ 303/119

FOREIGN PATENT DOCUMENTS 2623320 12/1977 Fed. Rep. of Germany ........ 303/96

*Primary Examiner*—J. D. Miller
*Assistant Examiner*—Reinhard J. Eisenzopf
*Attorney, Agent, or Firm*—Edwin E. Greigg

[57] ABSTRACT

An anti-skid system for motor vehicles in which the wheel speed is detected by individual transducers and in which two or more transducer signals are alternately periodically connected to a single processing channel for controlling the braking pressure. In order to improve the performance on an inhomogeneous road surface, the connection rhythm of transducers is changed upon the occurrence of a tendency of one of the wheels to lock. According to the invention, the two wheels associated with a single processing channel are the two wheels on the same side of the vehicle, especially the rear wheels of dual rear axle utility vehicles.

9 Claims, 3 Drawing Figures

ANTI-SKID CONTROL SYSTEM FOR MOTOR VEHICLES

BACKGROUND OF THE INVENTION

The invention relates to anti-skid systems for motor vehicles, sometimes also called anti-wheel lockup systems. More particularly, the invention relates to anti-skid systems which include wheel motion transducers and processing assemblies which use the signals from these transducers for controlling the hydraulic pressure in one or more of the wheel brakes.

A known anti-skid (anti-wheel lockup) system is described in the German Offenlegungsschrift No. 22 20 441. In the system described there, a plurality of transducers is connected sequentially to a processing channel and a brake pressure control unit engaged by the output signals from the processor channel varies the braking pressure of those wheels which are associated with a particular transducer. In the normal situation, the transducers are connected to the processor channel in a periodic sequence but when anyone of the wheels tends to lock up, the periodic switch-over from one transducer to the other is arrested and instead the transducer signal which indicates a tendency to lock is held connected with the processor channel until the tendency to lock up is no longer present. In the known system, the wheel brakes in which the pressure is jointly varied are the wheels mounted on a single axle.

The known system produces a so-called "select low" control. This type of control design is used for utility vehicles and its application results in increases of the braking distance when the road surface is irregular.

OBJECT AND SUMMARY OF THE INVENTION

It is a principal object of the present invention to provide an anti-skid system for motor vehicles in which the braking action is improved with respect to the known art, i.e., the required braking distance is reduced. It is an associated object of the present invention to provide an anti-skid system which is no more expensive to construct than is the known anti-skid system.

These and other objects are attained according to the invention by providing an anti-skid system of the general type described above in which the wheels of the vehicle whose braking pressure is controlled jointly lie on one or the other side of the vehicle. In particular, the invention relates to vehicles in which the wheels lie closely one behind the other, for example, in a motor vehicle with a plurality of rear axles, especially a dual rear axle.

The cycling of the switch-over between the wheel transducers normally is periodic but, when the wheels tend to lock, the connection time of the particular transducer indicating the tendency to lock up is prolonged from a normal time $T_1$ by an additional amount of time $T_2$. If the transducer then generates a further signal indicating a tendency for wheel lock up, the prolongation of its connection time is further increased. The invention provides means for testing if a particular transducer has been connected for a time longer than the time $T_3$. In such a case and after the disappearance of the tendency to lock, a switch-over rhythm is initiated which engages the second or other transducer for a short time $T_5$ and then returns the connection of the initial transducer for a time $T_4$ which is relatively long compared with $T_5$. This new rhythm is cancelled upon an occurrence of a new wheel lock up signal.

The invention makes it possible to change the various time, i.e., $T_1-T_5$ and in particular ratios of time, for example, $T_4/T_5$ in dependence on auxiliary signals, for example signals related to the vehicle's speed or signals related to the adhesion characteristics of the vehicle on the road surface, for example, the friction factor $\mu$.

A feature of the invention is to provide a switching means which arrests the periodic switch over cycle whenever one wheel indicates a lower speed than the other wheel without application of the brakes and it then connects the transducer of the other wheel.

The various connection times of the transducer, i.e., the times $T_1$, $T_2$, $T_4$, $T_5$, are defined by the variable initial contents of a backward or down counter which, upon reaching a zero content, generates an output signal that causes the transducer switch-over and is also used to reset itself to the initial count.

Another feature of the invention is that the circuit includes means for making the output signal from the down counter ineffective until a wheel which had tended to block returns to normal operation, for example based on the termination of an acceleration signal or the de-energization of the brake pressure in that valve.

The time $T_3$ is defined by a further counter which counts at a given clock rate and which is reset by the output signals of the first or down counter and which generates an appropriate output signal when the contents indicate that the time $T_3$ has been reached. Furthermore, each wheel transducer is associated with a digital storage member which is enabled when the associated transducer is connected so that it will be set when the output signal from the counter occurs. The setting of the storage member controls the correct association of the rhythm $T_4/T_5$ of the transducers.

The invention will be better understood as well as further objects and advantages thereof will become more apparent from the ensuing detailed description of a preferred exemplary embodiment taken in conjunction with the drawing.

DESCRIPTION OF THE PREFERRED EMBODIMENT

Figure 1:
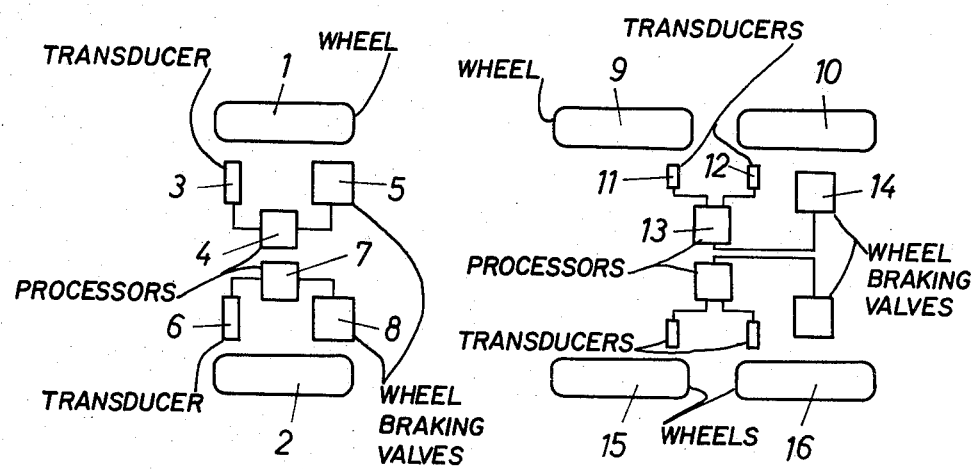
FIG. 1 is a schematic diagram of the wheels and associated brake control systems according to the invention in a three-axle vehicle.

Turning now to FIG. 1 there will be seen a schematic illustration of the front wheels 1 and 2 of a three-axle vehicle. Associated with the first wheel 1 is a wheel rotation transducer 3 whose signal goes to a suitable and known signal processor 4 which generates an output signal applied to a suitable brake pressure control valve assembly 5 also known per se. Similarly, a transducer 6, a processor 7 and a brake pressure unit 8 are associated in an identical manner with the second front wheel 2. The rear wheels 9 and 10 lying behind one another on one side of the vehicle are associated with a brake control system which provides individual wheel transducers 11 and 12, respectively, whose output signals are applied to a processor channel 13 in a manner to be described in detail below. The processor 13 then actuates a wheel braking valve assembly 14. An identical but independent system is used for the control of the rear wheel 15, 16 located on the other side of the vehicle.

Figure 2:
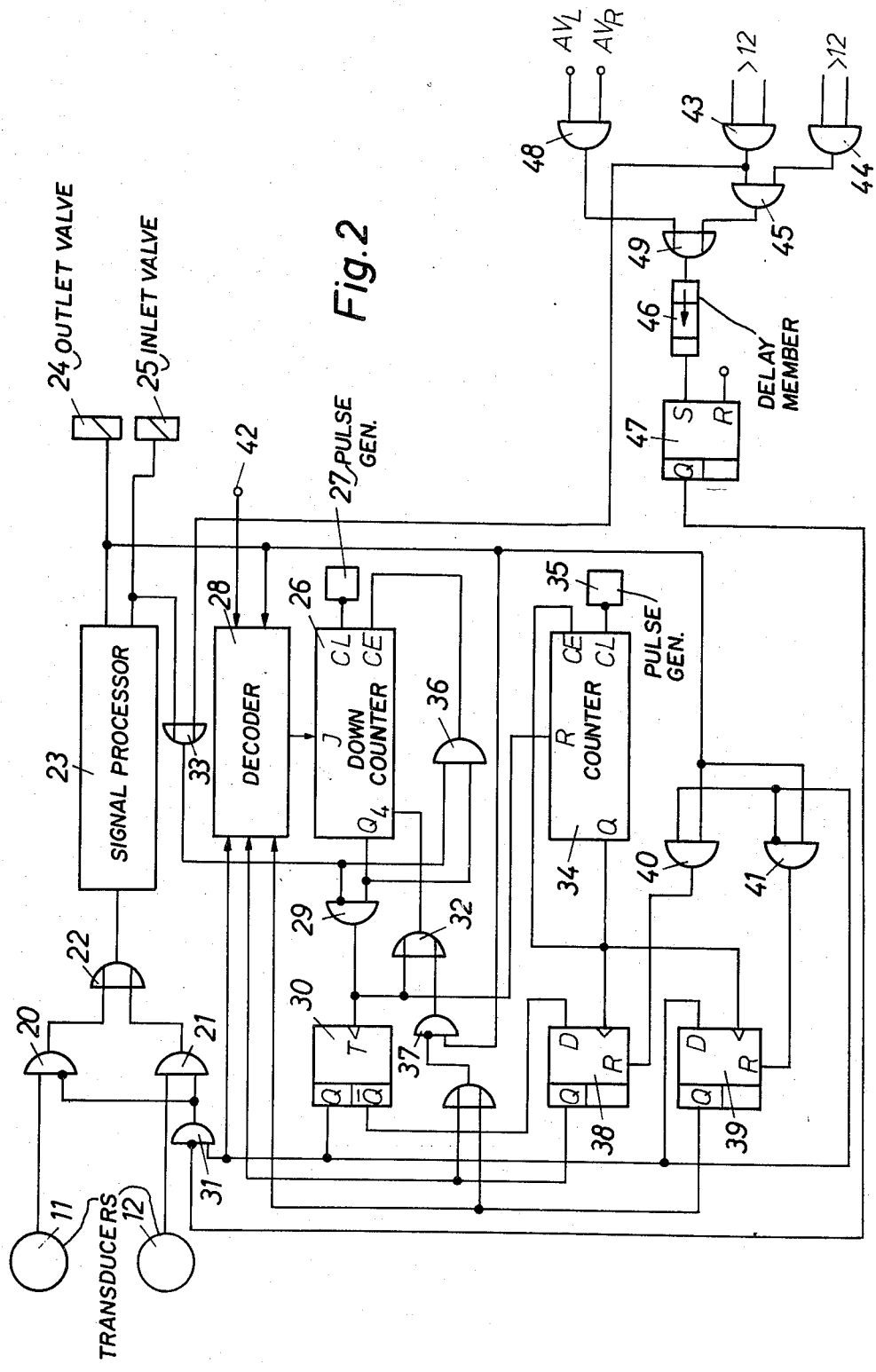
FIG. 2 is a block diagram of the electronic circuitry for one of the control channels in FIG. 1.

The interconnection in the control system which includes the transducers 11, 12, the processor 13 and the brake valve controller 14 is illustrated in detail in the diagram of FIG. 2. Shown there are the two wheel transducers 11, 12 whose output signals are applied, respectively, to one input of an AND-gate 20 and one input of a second AND-gate 21. The outputs of these two AND-gates are applied to respective inputs of an OR-gate 22 which drives a signal processor 23 which processes the signal in known manner to actuate an outlet valve 24 and an inlet valve 25 for controlling the brake fluid pressure in a braking system that jointly engages wheels 9 and 10.

The alternating connection of the two wheel transducers 11 and 12 is performed by means of a down counter 26 driven by a clock pulse generator 27 and connected to receive an initial counter content from a decoder 28. The output of the down counter 26 goes through a gate 29 and engages a bi-stable storage member 30 whose output in turn controls the connection of the transducers 11 and 12 to the processor 23.

When the vehicle is proceeding normally, the decoder 28 applies a initial content equivalent to a first time $T_1$ to the counter 26. The down counter 26 starts with a setting and counts down until it reaches a zero content at which time it generates an output signal at its Q output that passes the AND-gate 29 and flips the bi-stable member 30 into its second stable state. The Q output of the flip-flop 30 passes through the AND-gate 31, opens the AND-gate 21 and closes the AND-gate 20.

The output signal of the down counter is also applied through an OR-gate 32 to the reset input of the down counter 26 which is thereby returned to its initial setting corresponding to $T_1$. In this manner, the wheel transducers 11, 12 are alternately connected to the processor 23 for a period of time equal to $T_1$ as is illustrated in FIG. 3, row 2, where the output $Q_{30}$ from the flip-flop 30 is plotted while the triggering pulses from the counter 26 are plotted in the first row.

Let it be assumed that, while the transducer 12 is connected, there occurs a tendency of the associated wheel to lock up. Accordingly, the processor circuit 23 generates a signal AV which is shown in the column labeled Phase 2 in FIG. 3 on row 3. This signal is fed to the decoder 28 which acts to prolong the connection time from $T_1$ to $T_2$ and this signal is also applied through an AND-gate 37 and an OR-gate 32 to the reset input of the counter 26, thereby resetting the contents of this counter to the new initial count supplied by the decoder 28.

Figure 3:
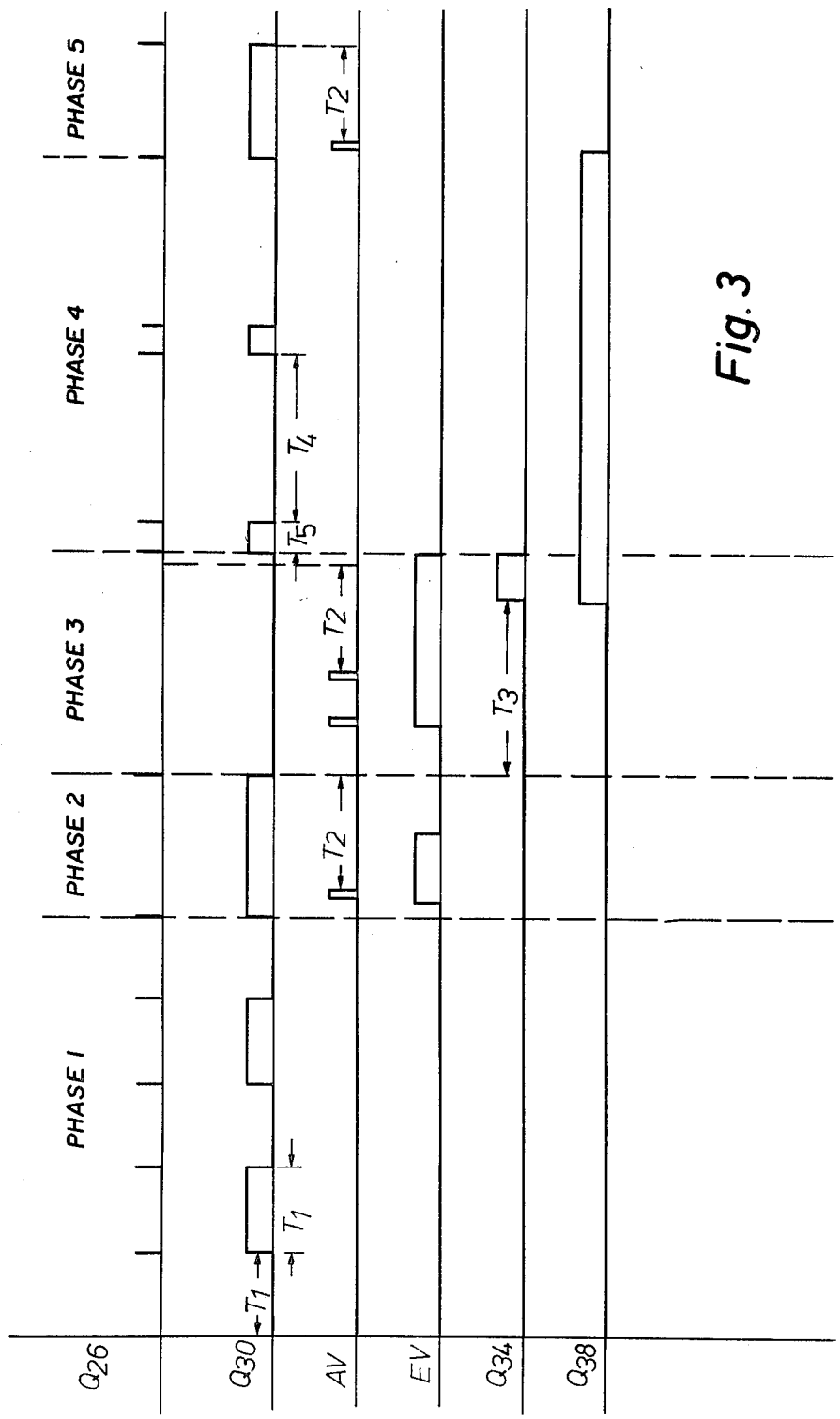
FIG. 3 is a timing diagram for clarification of the function of the circuit of FIG. 2.

It may be seen from rows 2 and 3 of FIG. 3 that the connection time of the transducer which happens to be connected at the moment of occurrence of the wheel lock up signal AV is prolonged by an amount of time equal to $T_2$. No further AV signal occurs during the time $T_2$ so that, at the expiration of the time $T_2$, the other transducer 11 is reconnected. While this transducer is connected, the associated wheel causes a double occurrence of an AV signal in Phase 3 of FIG. 3, each of which causes the down counter 26 to be reset. However, a control signal EV which comes from the outlet valve 24 of the braking system passes through the OR-gate 33 and blocks the AND-gate 29, thereby preventing the output signal from the down counter from resetting of the down counter. Furthermore the output signal of the OR-gate 33 effects via AND-gate 36 and input CE that the output-signal of counter 26 is stored. When the output-signal of OR-Gate 33 ceases the output-signal of counter 26 resets counter 26 and reconnects transducer 11 via flip-flop 30. Phase 3, a further counter 34 which is reset upon the occurrence of each output pulse from the gate 29 and which adds up the clock pulses of another pulse generator 35 has reached a content equal to a time $T_3$ and causes the occurrence of an output signal Q 34 which is plotted in row 5 of FIG. 3.

The occurrence of a signal $\overline{Q}$ output of the bistable member 30 prepares the storage member 38 to be set by the signal $Q_{34}$ while a similar storage unit 39 is prepared when the transducer 12 is connected. The signal then present at the output of the flip-flop 38 is fed to the decoder 28 where it initiates, subsequent to the disappearance of the EV signal, a connecting rhythm which consists of a short connection time $T_5$ of the transducer 12 followed by a relatively long connection time $T_4$ of the transducer 11, illustrated in Phase 4 of FIG. 3. In a Phase 5, this new rhythm is interupted by the occurrence of an AV signal which then reinitiates the sequence beginning with Phase 2. The storage flip-flops 38 and 39 are reset by the occurrence of AV signals via gates 40 and 41, respectively. After the storage flip-flop 38 or 39 is set, the AND-gate 37 is blocked and the counter 26 cannot be reset by an AV signal.

The times which are placed in the counter 26 by the decoder 28 may also be changed on the basis of external signals at a separate decoder input 42. These signals may be related for example to the vehicle's speed and can be used to increase the times $T_1$, $T_4$ and $T_5$.

If one of the rear axles of the vehicle is a lift axle, i.e., an axle which can be lifted from the road surface under the control of the operator, the switch over from one transducer to the other should be halted. To this end, gates 43 and 44 receive a vehicle signal, for example if the vehicle's speed exceeds 12 kilometers per hour. These gates also receive a signal if the transducer associated with the wheels on that axle does not indicate at least 5 kilometers per hour without braking. This condition is propagated through the AND-gate 45 and an OR-gate 49 and, if the condition prevails for a period of time set by a delay member 46, a storage unit 47 is set, arresting the periodic switch-over of the transducers by blocking the gate 31. The output of the gate 43 is also used to block the gate 29 during the delayed time imparted by the delay member 46.

The transducer switch-over is also prevented by the output of an AND-gate 48 which responds to the simultaneous occurrence of AV signals beyond the delayed time imparted by the delay member 46.

The foregoing relates to a preferred exemplary embodiment of the invention, it being understood that other embodiments and variants thereof are possible within the spirit and scope of the invention.

What is claimed and desired to be secured by Letters Patent of the United States is:

1. An anti-skid system for wheeled vehicles, especially motor vehicles, with at least two wheel speed transducers and a single processing channel for the signals from said at least two transducers, and including switching means connected to the at least two transducers and the processing channel, for providing alternate periodic connection of single ones of said at least two transducers to said processing channel, wherein the processing channel generates a brake command signal, and further including circuit means connected to the switching means for altering the rhythm of connection of said transducers, and wherein the improvement comprises: said at least two transducers being disposed to sense the speed of at least two wheels which are mounted on the same side of the vehicle, and a common brake pressure device which is connected to the processing channel to receive the brake command signal and is further connected to the at least two wheels such that the common brake pressure device jointly engages the at least two wheels.

2. An anti-skid system according to claim 1 wherein said at least two wheels are wheels lying closely one behind the other in a vehicle having more than two axles.

3. An anti-skid system according to claim 1 wherein said circuit means include a switch which prolongs the connection time of the transducer actually connected to said processing channel by a first predetermined amount of time when the associated wheel indicates a tendency to lock.

4. An anti-skid system according to claim 3 further comprising means for detecting that a transducer has been connected to said processing channel for a time exceeding a second predetermined amount of time such that after the disappearance of a tendency of the associated wheel lock, to actuate a switching rhythm causing the connection of said transducer for a third predetermined amount of time and thereafter a connection of the other transducer for a fourth predetermined amount of time which is greater than the third predetermined amount of time, and for cancelling the provision of this changed rhythm upon the occurrence of another signal indicating a tendency for wheel lock.

5. An anti-skid system according to claim 4 further comprising means for altering the first, second, third and fourth predetermined amounts of time 6. An anti-skid system according to claim 5 wherein said circuit means includes a down counter triggered by clock pulses whose preset content is equivalent to the connection time of a transducer and which, when reaching zero content, generates an output signal which causes the connection of the other of said transducers and the resetting of said down counter to its initial contents.

7. An anti-skid system according to claim 6 further comprising means for blocking the output signals from said down counter as long as there is an indication of a tendency for vehicle wheels to lock.

8. An anti-skid system according to claim 7 further comprising an up counter for defining the second predetermined amount of time, said up counter being triggered by clock pulses and being reset by the output signal from said down counter and said up counter generating an output signal at the expiration of the second predetermined amount of time and wherein said circuit means further comprise data storage means associated with each of said transducers, one of said data storage means being set by the signal from said up counter occurring at the end of the second predetermined amount of time thereby defining the association of the rhythm ratio of the fourth predetermined amount of time with respect to the third predetermined amount of time to the transducer.

9. An anti-skid system according to claim 1 wherein said circuit means includes a switching circuit which cancels the periodic alternate connection of said transducers and substitutes therefor a constant connection of a single transducer when ever, in the absence of applied braking, said single transducer indicates a wheel speed lower than that corresponding to the prevailing vehicle speed.

* * * * *